(12) United States Patent
Shin et al.

(10) Patent No.: US 8,698,968 B2
(45) Date of Patent: Apr. 15, 2014

(54) THIN FILM TRANSISTOR ARRAY PANEL AND LIQUID CRYSTAL DISPLAY USING THE SAME

(75) Inventors: Kyoung Ju Shin, Hwaseong-si (KR); Hak Sun Chang, Yongin-si (KR); Kyoung Tae Kim, Osan-si (KR); Jun Woo Lee, Suwon-si (KR); Min-Sik Jung, Seoul (KR)

(73) Assignee: Samsung Display Co. Ltd., Yongin, Gyeonggi-Do (KR)

( * ) Notice: Subject to any disclaimer, the term of this patent is extended or adjusted under 35 U.S.C. 154(b) by 321 days.

(21) Appl. No.: 13/161,096

(22) Filed: Jun. 15, 2011

(65) Prior Publication Data

US 2012/0154700 A1 Jun. 21, 2012

(30) Foreign Application Priority Data

Dec. 15, 2010 (KR) .......................... 10-2010-0128315

(51) Int. Cl.
*G02F 1/1343* (2006.01)
(52) U.S. Cl.
USPC ................................ 349/39; 349/48; 349/144
(58) Field of Classification Search
None
See application file for complete search history.

(56) References Cited

U.S. PATENT DOCUMENTS

| | | | |
|---|---|---|---|
| 5,940,056 A * | 8/1999 | Hanazawa et al. ............... | 345/87 |
| 2007/0058123 A1 | 3/2007 | Um et al. | |
| 2008/0174537 A1 * | 7/2008 | Su et al. ............................ | 345/98 |
| 2008/0284931 A1 * | 11/2008 | Kimura ............................. | 349/39 |
| 2009/0153759 A1 * | 6/2009 | Um et al. .......................... | 349/39 |
| 2009/0279034 A1 * | 11/2009 | Shoraku et al. ................ | 349/129 |
| 2009/0284703 A1 * | 11/2009 | Shoraku et al. ................ | 349/129 |
| 2010/0103339 A1 * | 4/2010 | Shimoshikiryoh et al. ...... | 349/39 |
| 2010/0123842 A1 | 5/2010 | Lee et al. | |

FOREIGN PATENT DOCUMENTS

| | | |
|---|---|---|
| JP | 09-043610 | 2/1997 |
| JP | 2008-287021 | 11/2008 |
| JP | 2009-175564 | 8/2009 |
| KR | 1020060074547 A | 7/2006 |
| KR | 1020060108931 A | 10/2006 |
| KR | 1020060125090 A | 12/2006 |
| KR | 102009007148 A | 1/2009 |
| KR | 1020090062112 A | 6/2009 |
| KR | 1020090123738 A | 12/2009 |
| KR | 1020100024639 A | 3/2010 |
| KR | 1020100056613 A | 5/2010 |
| WO | 2008/018552 A1 | 2/2008 |

* cited by examiner

*Primary Examiner* — Mike Stahl
(74) *Attorney, Agent, or Firm* — F. Chau & Associates, LLC

(57) ABSTRACT

A liquid crystal display includes a first substrate, a gate line, a data line, first-third power lines located on the first substrate, first-third sub-pixels, where a switching element of each is connected to the gate line and the data line, a second substrate, a common electrode that is formed on the second substrate, a liquid crystal layer located between the first and second substrates, and a power voltage driver outputting a low voltage during a first period and a high voltage during a subsequent second period to the first power line, a constant voltage during both periods to the second power line, and the high voltage during the first period and the low voltage during the second period to the third power line. The first power line, the second power line and the third power line overlap the first sub-pixel, the second sub-pixel, and the third sub-pixel, respectively.

30 Claims, 13 Drawing Sheets

THIN FILM TRANSISTOR ARRAY PANEL AND LIQUID CRYSTAL DISPLAY USING THE SAME

CROSS-REFERENCE TO RELATED APPLICATION

This application claims priority to Korean Patent Application No. 10-2010-0128315 filed in the Korean Intellectual Property Office on Dec. 15, 2010, the disclosure of which is incorporated by reference herein.

BACKGROUND (a) Technical Field

Embodiments of the present invention relate to a thin film transistor array panel and a liquid crystal display using the same.

(b) Discussion of Related Art

A liquid crystal display includes two display panels and a liquid crystal layer disposed therebetween. Field generating electrodes are located on the display panels such as a pixel electrode and a common electrode. Voltages are applied to the field generating electrodes, which generate an electric field on the liquid crystal layer. The generated field adjusts the alignment of liquid crystal molecules of the liquid crystal layer and controls the polarization of incident light to generate an image on the display.

A voltage-transmittance curve of the side of the liquid crystal display is different from a voltage-transmittance curve of the front of the display, such that the visibility at the side is lower as compared to the visibility at the front.

A wider viewing angle may be realized when domains of liquid crystals are present within the liquid crystal display having different alignment directions. A photoalignment method that controls an alignment direction and alignment angle of the liquid crystals can be used to form the domains. An aperture ratio may be increased and a response time of the liquid crystals may be shortened by a pre-tilt angle that is generated at the time of photoalignment.

However, a display texture may be visible at the boundary of the different domains, since the alignment directions of the liquid crystals are different. The texture reduces the amount of light transmitted and deteriorates the quality of images displayed.

SUMMARY

An exemplary embodiment of the present invention provides a liquid crystal display including: a first substrate, a gate line and a data line that are formed on the first substrate, a first power line to which a first low voltage is applied during a first period and a first high voltage is applied during a second period, a second power line to which a constant second voltage is applied during the first period and second period, a third power line to which a third high voltage is applied during the first period and a third low voltage is applied during the second period, a first switching element, a second switching element and a third switching element that are connected to the gate line and data line, an auxiliary boosting capacitor that is connected to the first switching element and the first power line, an auxiliary storage capacitor that is connected to the second switching element and the second power line, an auxiliary dropping capacitor that is connected to the third switching element and the third power line, and a first alignment layer that is formed by irradiating light on the first substrate in different directions. The first power line, the second power line and the third power line overlap a texture that is generated by irradiating light on the first alignment layer in different directions.

The first low voltage and the third low voltage may be the same as each other, and the first high voltage and the third high voltage may be the same as each other. The second voltage may be an average value of the first low voltage and the first high voltage.

An average voltage of the auxiliary boosting capacitor may be higher than an average voltage of the auxiliary storage capacitor, and an average voltage of the auxiliary storage capacitor may be higher than an average voltage of the auxiliary dropping capacitor.

The voltage of the auxiliary storage capacitor may be a fourth voltage during the first period and the second period, the voltage of the auxiliary boosting capacitor may be a fifth voltage that is higher than the fourth voltage during the first period and the fourth voltage during the second period, and the voltage of the auxiliary dropping capacitor may be a sixth voltage that is lower than the fourth voltage during the first period and the fourth voltage during the second period. The first period and the second period may be repeated several times during one frame.

The liquid crystal display may further include a first liquid crystal capacitor that is connected to the first switching element and the first power line, a second liquid crystal capacitor that is connected to the second switching element and the second power line, and a third liquid crystal capacitor that is connected to the third switching element and the third power line.

The average voltage of the first liquid crystal capacitor may be higher than the average voltage of the second liquid crystal capacitor, and the average voltage of the second liquid crystal capacitor may be higher than the average voltage of the third liquid crystal capacitor.

The voltage of the second liquid crystal capacitor may be a seventh voltage during the first period and the second period, the voltage of the first liquid crystal capacitor may be an eighth voltage that is higher than the seventh voltage during the first period and the seventh voltage during the second period, and the voltage of the third liquid crystal capacitor may be a ninth voltage that is lower than the seventh voltage during the first period and the seventh voltage during the second period. The first period and the second period may be repeated several times during one frame.

A ratio of the average voltage of the first liquid crystal capacitor, the average voltage of the second liquid crystal capacitor, and the average voltage of the third liquid crystal capacitor may be 1:0.6 to 0.85:0.4 to 0.7.

The gate line may include a first sub-gate line and a second sub-gate line, and the same voltage may be applied to the first sub-gate line and the second sub-gate line. The first switching element and the second switching element may be connected to the first sub-gate line, and the third switching element may be connected to the second sub-gate line.

The liquid crystal display may further include a pixel electrode that includes a first sub-pixel electrode that is connected to the first switching element, a second sub-pixel electrode that is connected to the second switching element, and a third sub-pixel electrode that is connected to the third switching element, wherein a terminal of a side of the auxiliary boosting capacitor may be the first sub-pixel electrode, a terminal of a side of the auxiliary storage capacitor may be the second sub-pixel electrode, and a terminal of a side of the auxiliary dropping capacitor may be the third sub-pixel electrode.

An area ratio of the first sub-pixel electrode, the second sub-pixel electrode and the third sub-pixel electrode may be 1:1 to 2:1 to 2.

An exemplary embodiment of the present invention provides a liquid crystal display including: a first substrate; a gate line, a data line, a first power line, a second power line and a third power line that are formed on the first substrate, a first switching element, a second switching element and a third switching element that are connected to the gate line and data line, a pixel electrode that includes a first sub-pixel electrode that is connected to the first switching element, a second sub-pixel electrode that is connected to the second switching element, and a third sub-pixel electrode that is connected to the third switching element, a first alignment layer that is formed by irradiating light on the first substrate in different directions, a second substrate, a common electrode that is formed on the second substrate, a second alignment layer that is formed by irradiating light on the second substrate in different directions, and a liquid crystal layer that is formed between the first substrate and the second substrate. A first low voltage is applied during a first period and a first high voltage is applied during a second period to the first power line, a constant second voltage is applied during the first period and a second period to the second power line, and a third high voltage is applied during the first period and a third low voltage is applied during the second period to the third power line. The first power line, the second power line, the third power line and the second alignment layer overlap a texture that is generated by irradiating light on the first alignment layer in different directions.

The first low voltage and the third low voltage may be the same as each other, and the first high voltage and the third high voltage may be the same as each other. The second voltage may be an average value of the first low voltage and the first high voltage.

The average voltage of the first sub-pixel electrode may be higher than the average voltage of the second sub-pixel electrode, and the average voltage of the second sub-pixel electrode may be higher than the average voltage of the third sub-pixel electrode. A voltage ratio of the first sub-pixel electrode, the second sub-pixel electrode and the third sub-pixel electrode may be 1:0.6 to 0.85:0.4 to 0.7. An area ratio of the first sub-pixel electrode, the second sub-pixel electrode and the third sub-pixel electrode may be 1:1 to 2:1 to 2.

The data line may include a first sub-data line and a second sub-data line that are connected to each other, the first sub-data line may be formed adjacent an edge of the pixel electrode to one side of the edge, and the second sub-data line may be formed adjacent the edge of the pixel electrode to the other side of the edge. The data line may include first sub-data line and a second sub-data line that are connected to each other and alternately disposed.

The first sub-pixel electrode, the second sub-pixel electrode and the third sub-pixel electrode may be divided into an upper portion and a lower portion, an edge of a side of the upper portion may overlap the first sub-data line, and an edge of the other side of the lower portion may overlap the second sub-data line.

The first sub-pixel electrode, the second sub-pixel electrode and the third sub-pixel electrode may be divided into an upper portion and a lower portion, edges of sides of the upper portion of the first and the third sub-pixel electrodes and the lower portion of the second sub-pixel electrode may overlap the first sub-data line, and edges of the other sides of the lower portion of the first and the third sub-pixel electrodes and the upper portion of the second sub-pixel electrode may overlap the second sub-data line.

The first power line may be formed in a direction that is parallel to the gate line at a central portion of the first sub-pixel electrode, the second power line may be formed in a direction that is parallel to the gate line at a central portion of the second sub-pixel electrode, and third power line may be formed in a direction that is parallel to the gate line at a central portion of the third sub-pixel electrode.

An exemplary embodiment of the present invention provides a thin film transistor array panel including: a first substrate; a pair of gate lines that is formed on the first substrate; a first power line that is formed on the first substrate and is disposed at an upper side above the pair of gate lines, a second power line that is disposed between the pair of gate lines, and a third power line that is disposed an a lower side below the pair of gate lines, a data line that is formed on the first substrate and crosses the pair of gate lines while being insulated from the gate lines, a first switching element, a second switching element and a third switching element that are connected to one of the pair of gate lines and the data line, and a first sub-pixel electrode, a second sub-pixel electrode and a third sub-pixel electrode that are connected to the first switching element, the second switching element and the third switching element. Rectangular waves that have different polarities are applied to the first power line and the third power line, and a signal having a constant potential is applied to the second power line.

Output terminals of the first switching element, the second switching element and the third switching element may include an extended part, and the extended part of each of the first switching element, the second switching element and the third switching element may overlap the first power line, the second power line and the third power line.

The extended parts of the first switching element, the second switching element and the third switching element may be electrically connected to the first sub-pixel electrode, second sub-pixel electrode and third sub-pixel electrode through contact holes.

The thin film transistor array panel may further include a fourth power line that is formed on the first substrate, is an upper side of the first power line, and overlaps at least a portion of an edge of a side of the first sub-pixel electrode; and a fifth power line that is formed on the first substrate, is a lower side of the third power line, and overlaps at least a portion of an edge of a side of the third sub-pixel electrode.

Rectangular waves that have different polarities and are applied to the first power line and the third power line may be applied to the fourth power line and the fifth power line. The fourth power line may be connected to the first power line and the fifth power line may be connected to the third power line.

According to an exemplary embodiment of the present invention, a liquid crystal display includes a first substrate, a gate line, a data line, first-third power lines located on the first substrate, first-third sub-pixels, where a switching element of each is connected to the gate line and the data line, a second substrate, a common electrode that is formed on the second substrate, a liquid crystal layer located between the first and second substrates, and a power voltage driver outputting a low voltage during a first period and a high voltage during a subsequent second period to the first power line, a constant voltage during both periods to the second power line, and the high voltage during the first period and the low voltage during the second period to the third power line. The first power line, the second power line and the third power line overlap the first sub-pixel, the second sub-pixel, and the third sub-pixel, respectively.

DETAILED DESCRIPTION

Figure 1:
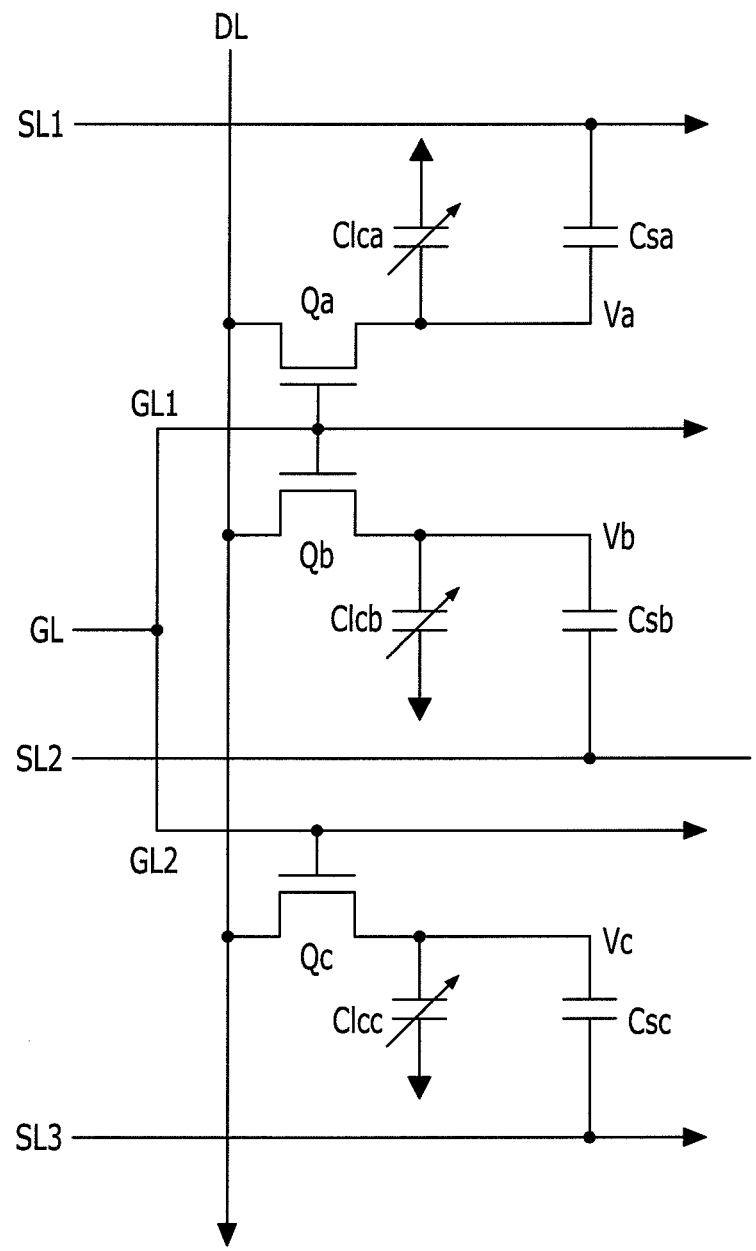
FIG. 1 is an equivalent circuit diagram for a pixel of a liquid crystal display according to an exemplary embodiment of the present invention.

The present invention will be described more fully hereinafter with reference to the accompanying drawings, in which exemplary embodiments of the invention are shown. The described embodiments may be modified in various different ways, without departing from the spirit or scope of the disclosure.

In the drawings, the thickness of layers, films, panels, regions, etc., may be exaggerated for clarity. Like reference numerals designate like elements throughout the specification. It will be understood that when an element such as a layer, film, region, or substrate is referred to as being "on" another element, it can be directly on the other element or intervening elements may also be present.

Figure 2:
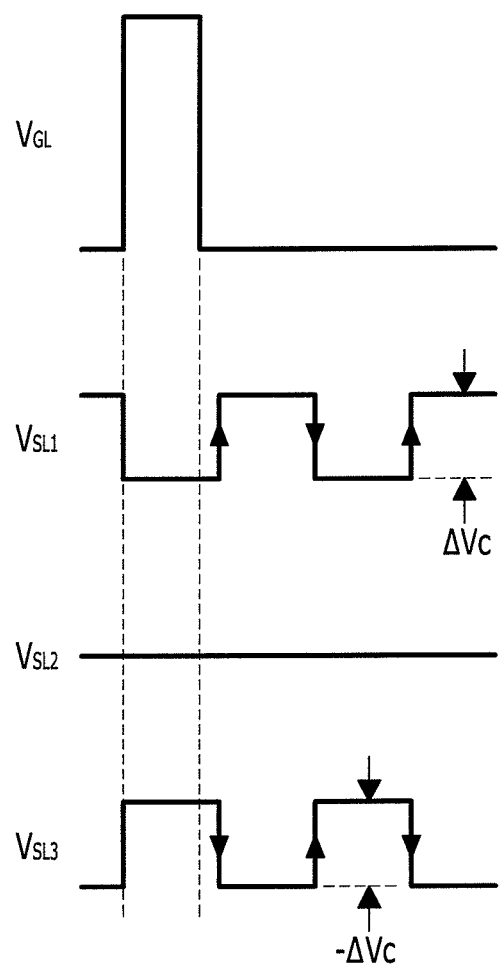
FIG. 2 is an exemplary waveform diagram of signals that may be applied to a gate line, a first power line, a second power line and a third power line of FIG. 1.
Figure 3:
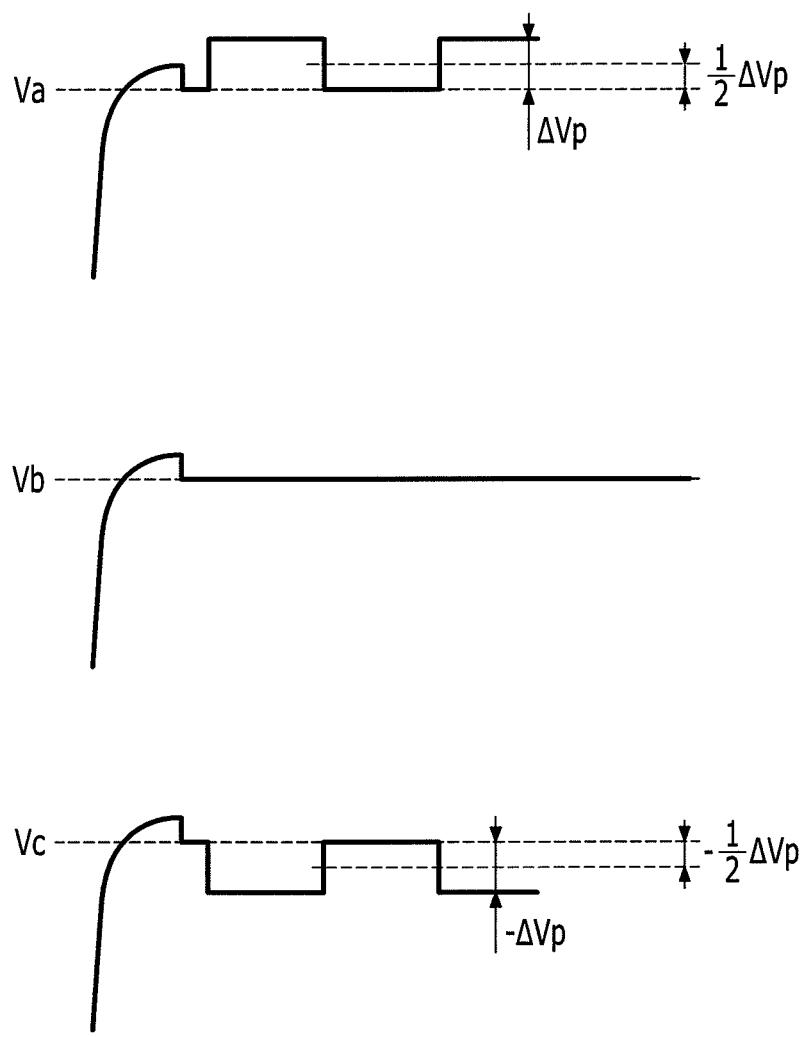
FIG. 3 is an exemplary waveform diagram of voltages of a first sub-pixel electrode, a second sub-pixel electrode and a third sub-pixel electrode of FIG. 1.

FIG. 1 is an equivalent circuit diagram of a pixel of a liquid crystal display according to an exemplary embodiment of the present invention. FIG. 2 is an exemplary waveform diagram of signals that may be applied to a gate line, a first power line, a second power line and third power line of FIG. 1. FIG. 3 is an exemplary waveform diagram of voltages of a first sub-pixel electrode, a second sub-pixel electrode and a third sub-pixel electrode of FIG. 1.

As shown in FIG. 1, a pixel of the liquid crystal display includes a gate line GL, a data line DL, a first power line SL1, a second power line SL2, a third power line SL3, a first switching element Qa, a second switching element Qb, and a third switching element Qc that are connected to the gate line GL and the data line DL.

The pixel further includes an auxiliary boosting capacitor Csa and a first liquid crystal capacitor Clca that are connected to the first switching element Qa, an auxiliary storage capacitor Csb and a second liquid crystal capacitor Clcb that are connected to the second switching element Qb, and an auxiliary dropping capacitor Csc and a third liquid crystal capacitor Clcc that are connected to the third switching element Qc.

The gate line GL may branch into a first sub-gate line GL1 and a second sub-gate line GL2 so a same gate signal $V_{GL}$ may be applied to the first sub-gate line GL1 and the second sub-gate line GL2.

The first switching element Qa, the second switching element Qb and the third switching element Qc include three terminals and may be thin film transistors. The first switching element Qa and the second switching element Qb may be connected to the first sub-gate line GL1, and the third switching element Qc may be connected to the second sub-gate line GL2. Since the same signal is applied to the first sub-gate line GL1 and the second sub-gate line GL2, the first to the third switching elements Qa, Qb, Qc are switched by the same signal. In addition, since the first to the third switching elements Qa, Qb, and Qc are connected to the data line DL, the same data signal is applied thereto.

As shown in FIG. 2, a voltage that swings in a constant period is applied to the first power line SL1 and the third power line SL3, and a constant-shaped voltage is applied to the second power line SL2.

As an example, a first low voltage is applied to the first power line SL1 during a first period, and a first high voltage is applied to the first power line SL1 during a second period after the first. In the example, a constant second voltage is applied to the second power line SL2 during the first period and the second period. Also in the example, a third high voltage is applied during the first period to the third power line SL3 and a third low voltage is applied during the second period to the third power line SL3. In this example, the first period and the second period are repeated several times during one frame, such that the voltage that swings is applied to the first power line SL1 and the third power line SL3.

In this example, the first low voltage and the third low voltage may be the same as each other, and the first high voltage and the third high voltage may be the same as each other. In addition, the second voltage may be a value between the first low voltage and the first high voltage or a middle value that is an average value of the first low voltage and the first high voltage.

A difference between the first low voltage and the first high voltage is ΔVc, and a difference between the third low voltage and the third high voltage is ΔVc.

The auxiliary boosting capacitor Csa is connected to the first switching element Qa and the first power line SL1, the auxiliary storage capacitor Csb is connected to the second switching element Qb and the second power line SL2, and the auxiliary dropping capacitor Csc is connected to the third switching element Qc and the third power line SL3.

With reference to FIG. 3, since the constant second voltage is applied to the second power line SL2, a voltage Vb of a terminal (hereinafter, referred to as 'the second terminal')

between the auxiliary storage capacitor Csb and the second switching element Qb has a constant fourth voltage.

When the first low voltage is applied to the first power line SL1, a voltage Va of a terminal (hereinafter, referred to as 'the first terminal') between the auxiliary boosting capacitor Csa and the first switching element Qa has a fifth voltage that is higher than the fourth voltage. When the first high voltage is applied to the first power line SL1, the voltage Va of the first terminal has the fourth voltage. Thus, the voltage Va of the first terminal has a voltage that swings since it repeatedly alternates between the fifth voltage and the fourth voltage.

When the third high voltage is applied to the third power line SL3, a voltage Vc of a terminal (hereinafter, referred to as 'the third terminal') between the auxiliary dropping capacitor Csc and the third switching element Qc has a sixth voltage that is lower than the fourth voltage. When the third low voltage is applied to the third power line SL3, the voltage Vc of the third terminal has the fourth voltage. Thus, the voltage Vc of the third terminal has a voltage that swings since it repeatedly alternates between the sixth voltage and the fourth voltage.

A difference between the fourth voltage and the fifth voltage is ΔVp, and a difference between the fourth voltage and the sixth voltage is ΔVp. The correlation between ΔVc and ΔVp may be represented by Equation 1 below:

$$\Delta Vp = \Delta Vc * \frac{C_{Csa}}{C_{Csa} + C_{Clca} + Cgs} \qquad \text{(Equation 1)}$$

where $C_{Csa}$ is the capacitance of the auxiliary boosting capacitor Csa, $C_{Clca}$ is the capacitance of the first liquid crystal capacitor Clca, and Cgs is the capacitance between the control terminal and input terminal of the first switching element Qa.

The capacitance $C_{Csa}$ of the auxiliary boosting capacitor Csa and the capacitance $C_{Clca}$ of the first liquid crystal capacitor Clca are the same as each other, and the capacitance Cgs between the control terminal and input terminal of the first switching element Qa may be small so as to be negligible as compared to the capacitance $C_{Csa}$ of the auxiliary boosting capacitor Csa and the capacitance $C_{Clca}$ of the first liquid crystal capacitor Clca. As an example, ΔVp may be ½ of ΔVc.

As shown by the voltage Va of the first terminal in FIG. 3, the same voltage as the data voltage Vd and a voltage higher than the data voltage Vd by ΔVp are applied from the data line DL, and repeated several times during one frame. Accordingly, the average value Va avg of the voltage Va of the first terminal during one frame is higher than the data voltage Vd by ½*ΔVp, as shown by the following Equation 2.

$$(Va)\text{avg}=Vd+½\Delta Vp \qquad \text{(Equation 2)}$$

The voltage Vb of the second terminal is maintained during one frame as the same voltage as the data voltage Vd. Accordingly, the average value (Vb)avg of the voltage Vb of the second terminal during one frame is the same as the data voltage Vd, as shown by the following Equation 3.

$$(Vb)\text{avg}=Vd \qquad \text{(Equation 3)}$$

As shown by the voltage Vc of the third terminal, the same voltage as the data voltage Vd and a voltage lower than the data voltage Vd by ΔVp are repeated several times during one frame. Accordingly, the average value (Vc)avg of the voltage Vc of the third terminal during one frame is lower than the data voltage Vd by ½*ΔVp, as shown by the following Equation 4.

$$(Vc)\text{avg}=Vd-½\Delta Vp \qquad \text{(Equation 4)}$$

Therefore, even though the same data voltage Vd is supplied from the same data line DL, the voltage Va of the first terminal, the voltage Vb of the second terminal, and the voltage Vc of the third terminal become different from each other through a difference between the voltages that are applied to the first power line SL1, the second power line SL2 and the third power line SL3.

Accordingly, the voltages of the auxiliary boosting capacitor Csa and the first liquid crystal capacitor Clca swing in the same manner as the first terminal voltage Va. The voltages of the auxiliary storage capacitor Csb and the second liquid crystal capacitor Clcb swing in the same manner as the second terminal voltage Vb. The voltages of the auxiliary dropping capacitor Csc and the third liquid crystal capacitor Clcc swing in the same manner as the third terminal voltage Vc.

Therefore, the average voltage of the auxiliary boosting capacitor Csa is higher than the average voltage of the auxiliary storage capacitor Csb, and the average voltage of the auxiliary storage capacitor Csb is higher than the average voltage of the auxiliary dropping capacitor Csc.

In addition, the average voltage of the first liquid crystal capacitor Clca is higher than the average voltage of the second liquid crystal capacitor Clcb, and the average voltage of the second liquid crystal capacitor Clcb may be higher than the average voltage of the third liquid crystal capacitor Clcc. In an exemplary embodiment of the invention, a ratio of the average voltage of the first liquid crystal capacitor Clca, the average voltage of the second liquid crystal capacitor Clcb, and the average voltage of the third liquid crystal capacitor Clcc is 1:0.6 to 0.85:0.4 to 0.7.

The side visibility of the liquid crystal display may be expanded when a difference occurs between the voltages that are charged in the first liquid crystal capacitor Clca, the second liquid crystal capacitor Clcb and the third liquid crystal capacitor Clcc.

Figure 4:
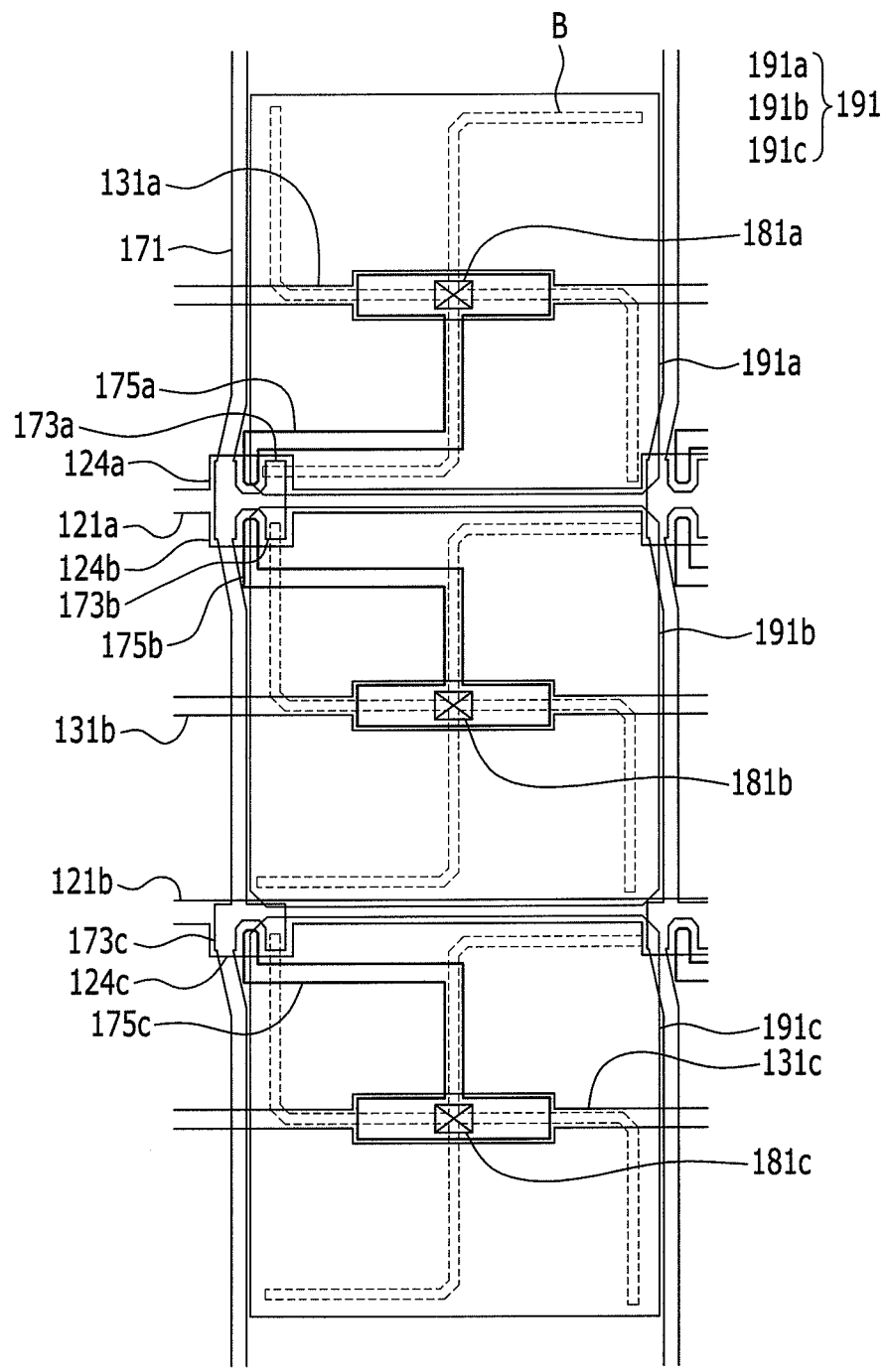
FIG. 4 is a layout view of a lower panel of a liquid crystal display according to an exemplary embodiment of the present invention.

FIG. 4 is a layout view of a lower panel of a liquid crystal display according to an exemplary embodiment of the present invention. Referring to FIG. 4, a first sub-gate line 121a, a second sub-gate line 121b, a first power line 131a, a second power line 131b and a third power line 131c are formed on a first substrate (not shown) of the display. The first substrate may be made of transparent glass or plastic.

The first sub-gate line 121a and the second sub-gate line 121b transmit a gate signal, and may mainly extend in a horizontal direction. Although not shown in the drawings, a single gate line branches into the first sub-gate line 121a and the second sub-gate line 121b, and the same signal is applied to the first sub-gate line 121a and the second sub-gate line 121b.

The first sub-gate line 121a includes a first gate electrode 124a that may protrude upward and a second gate electrode 124b that may protrude downward. The second sub-gate line 121b includes a third gate electrode 124c that may protrude downward. Since the first gate electrode 124a, the second gate electrode 124b and the third gate electrode 124c are connected to the first sub-gate line 121a and the second sub-gate line 121b to which the same signal is applied, the same gate signal is applied thereto.

A voltage that swings in a constant period is applied to a first power line 131a and a third power line 131c, and a constant-shaped voltage is applied to a second power line 131b.

A first low voltage is applied to the first power line 131a during the first period, and a first high voltage is applied during the second period. A second constant voltage is applied during the first period and the second period to the second power line 131b. A third high voltage is applied during the first period and a third low voltage is applied during the second period to the third power line 131c. In this example, the first period and the second period are repeated several times during one frame, such that the voltage that swings is applied to the first power line 131a and the third power line 131c.

In this example, the first low voltage and the third low voltage may be the same as each other, and the first high voltage and the third high voltage may be the same as each other. In addition, the second voltage may be a value between the first low voltage and the first high voltage or a middle value that is an average of the first low voltage and the first high voltage.

The first power line 131a may be formed at an upper side of the lower panel relative to the first gate line 121a (e.g., above line 121a). The second power line 131b may be formed between the first gate line 121a and the second gate line 121b. The third power line 131c may be formed at a lower side of the lower panel relative to the second gate line 121b (e.g., below line 121b).

A gate insulating layer (not shown) may be formed on the first sub-gate line 121a, the second sub-gate line 121b, the first power line 131a, the second power line 131b and the third power line 131c. A semiconductor island (not shown) may be formed on the gate insulating layer. The semiconductor may be disposed on the first, second and third gate electrodes 124a, 124b, and 124c.

A plurality of data lines (data line) 171, a first source electrode 173a, a second source electrode 173b, a third source electrode 173c, a first drain electrode 175a, a second drain electrode 175b, and a third drain electrode 175c are formed on the semiconductor and gate insulating layer.

The data line 171 transmits a data signal, may mainly extend in a vertical direction, and crosses the first and the second sub-gate lines 121a and 121b.

The first source electrode 173a, the second source electrode 173b and the third source electrode 173c protrude from the data line 171 and are formed on the first gate electrode 124a, the second gate electrode 124b, the third gate electrode 124c, respectively. Since the first source electrode 173a, the second source electrode 173b and the third source electrode 173c protrude from the same data line 171, the same data voltage is applied thereto. The first source electrode 173a, the second source electrode 173b and the third source electrode 173c may have a U-shape.

The first drain electrode 175a is separated from the first source electrode 173a, and may include a rod end that faces the first source electrode 173a relative to the first gate electrode 124a, and an extended part that is extended to partially overlap the first power line 131a. The rod end may be partially surrounded by the U-shaped and bent first source electrode 173a.

The second drain electrode 175b is separated from the second source electrode 173b, and may include a rod end that faces the second source electrode 173b relative to the second gate electrode 124b, and an extended part that is extended to partially overlap the second power line 131b. The rod end is partially surrounded by the U-shaped and bent second source electrode 173b.

The third drain electrode 175c is separated from the third source electrode 173c, and may include a rod end that faces the third source electrode 173c based on the third gate electrode 124c, and an extended part that is extended to partially overlap the third power line 131c. The rod end is partially surrounded by the U-shaped and bent third source electrode 173c.

The first gate electrode 124a, the first source electrode 173a, and the first drain electrode 175a form a first switching element Qa (see FIG. 1). The second gate electrode 124b, the second source electrode 173b, and the second drain electrode 175b form a second switching element Qb (see FIG. 1). The third gate electrode 124c, the third source electrode 173c, and the third drain electrode 175c form a third switching element Qc (see FIG. 1).

A passivation layer (not shown) may be formed on the data line 171, the first, second and third source electrodes 173a, 173b, and 173c, and the first, second and third drain electrodes 175a, 175b, and 175c. The passivation layer may be made of inorganic insulator or organic insulator. The passivation layer may have a flat surface. The passivation layer may have a dual-layer structure in which an inorganic layer is a lower layer and an organic layer is an upper layer. The dual-layer structure may ensure insulating characteristics of the organic layer while preventing the exposed semiconductor portion from being damaged.

In the passivation layer, a first contact hole 181a that partially exposes a portion of the first drain electrode 175a, a second contact hole 181b that partially exposes a portion of the second drain electrode 175b, and a third contact hole 181c that partially exposes a portion of the third drain electrode 175c are formed.

A pixel electrode 191 that includes first sub-pixel electrode 191a, a second sub-pixel electrode 191b and a third sub-pixel electrode 191c is formed on the passivation layer. The pixel electrode may be formed from a transparent material such as ITO (Indium Tin Oxide) or IZO (Indium Zinc Oxide). The first sub-pixel electrode 191a is connected to the first drain electrode 175a through the first contact hole 181a, the second sub-pixel electrode 191b is connected to the second drain electrode 175b through the second contact hole 181b, and the third sub-pixel electrode 191c is connected to the third drain electrode 175c through the third contact hole 181c.

Although not shown in the drawings, a common electrode (not shown) to which a constant voltage is applied is formed on a second substrate (not shown) that faces a first substrate (e.g., the lower panel) while being attached thereto, and a liquid crystal layer (not shown) is foamed between the first substrate and the second substrate.

The first sub-pixel electrode 191a, the second sub-pixel electrode 191b, and the third sub-pixel electrode 191c maintain the applied voltage even after the first, second and third switching elements Qa, Qb, Qc are in an off state by forming first, second and third liquid crystal capacitors Clca, Clcb, and Clcc (see FIG. 1) in conjunction with the common electrode that is formed on the second substrate and the liquid crystal layer interposed therebetween.

In addition, the first sub-pixel electrode 191a forms an auxiliary boosting capacitor Csa (see FIG. 1) in conjunction with the first power lines 131a and the passivation layer is interposed therebetween so that the voltage of the first liquid crystal capacitor Clca (see FIG. 1) is increased. The second sub-pixel electrode 191b forms an auxiliary storage capacitor Csb (see FIG. 1) in conjunction with the second power lines 131b and the passivation layer is interposed therebetween so that the voltage of the second liquid crystal capacitor Clcb (see FIG. 1) is maintained. The third sub-pixel electrode 191c forms an auxiliary dropping capacitor Csc (FIG. 1) in conjunction with the third power line 131c and the passivation layer is interposed therebetween so that the voltage of the third liquid crystal capacitor Clcc (see FIG. 1) is decreased.

The alignment layer may be formed on the first and the second substrates of the liquid crystal display according to an exemplary embodiment of the present invention. A photo-alignment that controls alignment direction and alignment angle of liquid crystals of the liquid crystal layer may be implemented irradiating the alignment layer. The aperture ratio and the response speed of liquid crystal may be increased by the photoalignment method. However, a portion in which alignment directions of liquid crystals are different from each other at the boundary of different domains is present, such that a visible texture may occur at that portion.

In FIG. 4, the portion B is a region in which the texture occurs, and luminance in this region is higher as compared to the other regions. Accordingly, the effect of the texture may be decreased by covering the corresponding portion. Among them, the vertical line portion that crosses the center of the first, second and third sub-pixel electrodes 191a, 191b, and 191c does not greatly differ in luminance as compared to the other regions when viewed from the side and front because the liquid crystal lies at an angle of 0. However, the horizontal line portion that crosses the center of the first, second and third sub-pixel electrodes 191a, 191b, and 191c may greatly differ in luminance as compared to the other regions when viewed from the side because the liquid crystal stands at an angle of 90.

Therefore, the first power line 131a, the second power line 131b and the third power line 131c may be formed so that they cover the horizontal line portion that crosses the center of the first sub-pixel electrode 191a, the second sub-pixel electrode 191b, and the third sub-pixel electrode 191c, thereby preventing the effect by the texture. Rectangular waves that have different polarities may be applied to the first power line 131a and the third power line 131c.

In a liquid crystal display according to an exemplary embodiment of the invention, the effect of the texture that crosses the center of the pixel may be decreased, but the effect of the texture that is formed at the edge of the pixel remains as it is.

Figure 5:
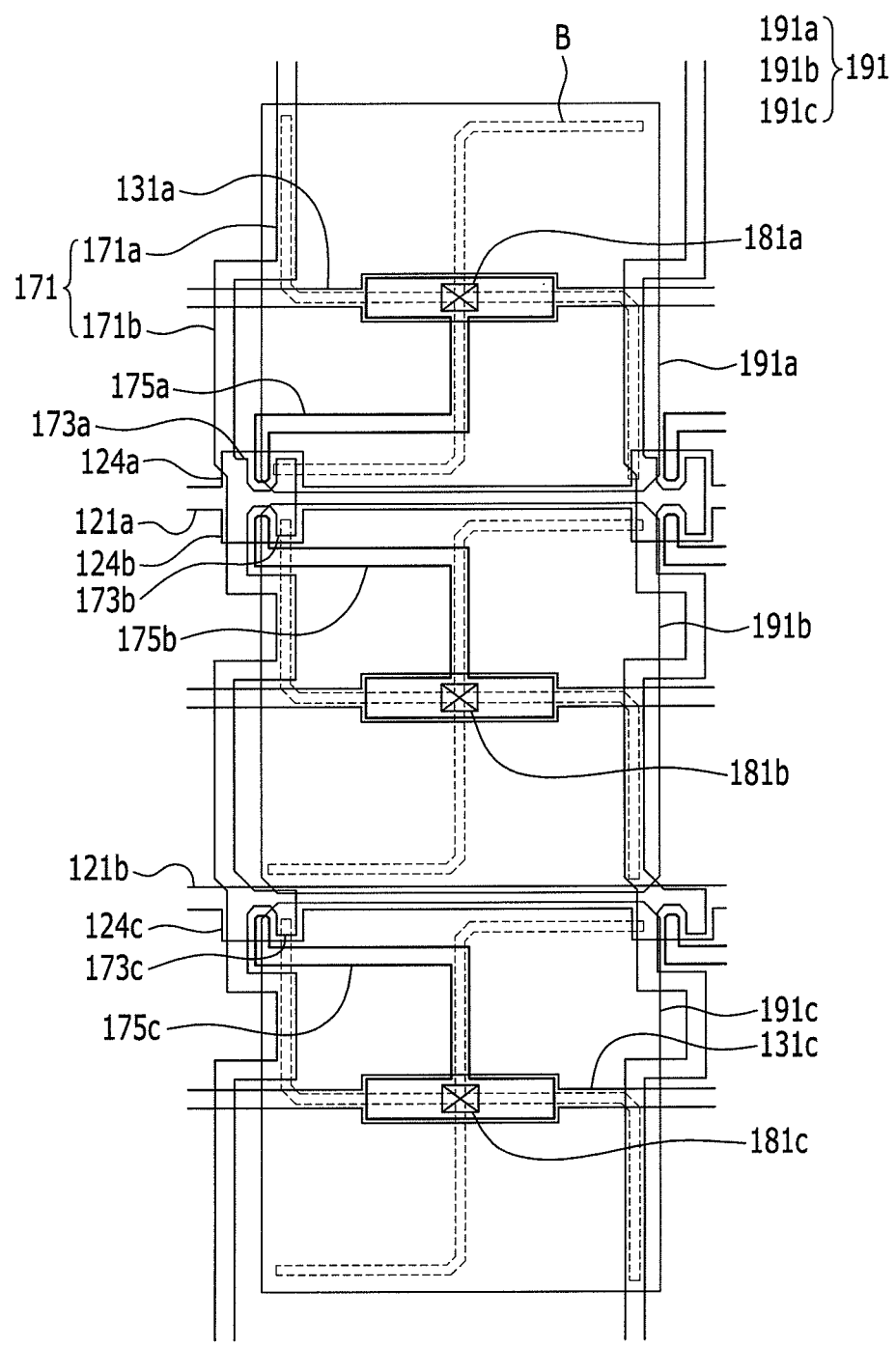
FIG. 5 is a layout view of a lower panel of a liquid crystal display according to an exemplary embodiment of the present invention.

Hereinafter, referring to FIG. 5, a liquid crystal display according to an exemplary embodiment of the present invention that may decrease the effect of the texture that is formed at the edge of the pixel will be described below. FIG. 5 is a layout view of the liquid crystal display.

Since the structure of the liquid crystal display as shown in FIG. 5 has many configurations that are similar to those of the liquid crystal display of FIG. 4, only portions having differences will be described.

In the liquid crystal display of FIG. 5, unlike the display of FIG. 4, the data line 171 is not formed in a straight line. The data line 171 is formed of a first sub-data line 171a and a second sub-data line 171b that are connected to each other, and the first sub-data line 171a and the second sub-data line 171b are disposed on different lines. For example, the first sub-data line 171a is formed adjacent an edge of the pixel electrode 191 to the right of the edge, and the second sub-data line 171b is formed adjacent the edge of the pixel electrode 191 to the left of the edge.

The first sub-data line 171a and the second sub-data line 171b are connected and may be alternately disposed. For example, the first sub-data line 171a may be located to the left of the edge and the second sub-data line 171b may be located to the right of the edge.

The first, second and third sub-pixel electrodes 191a, 191b, and 191c are divided into two parts, e.g., an upper part and a lower part. The edges of the left sides of the upper parts of the first, second and third sub-pixel electrodes 191a, 191b, and 191c overlap the first sub-data line 171a, and the edges of the right sides of the lower parts of the first, second and third sub-pixel electrodes 191a, 191b, and 191c overlap the second sub-data line 171b. Therefore, the effect of the texture that is formed at the edge of the pixel may be decreased.

An exemplary embodiment of the present invention has been described above where each of the first, second and third power lines 131a, 131b, and 131c cross the center of the first, second, and third sub-pixel electrodes 191a, 191b, and 191c, and the first and the second sub-data lines 171a and 171b overlap the edges of the left side of the upper part and the right side of the lower part of the first, second, and third sub-pixel electrodes 191a, 191b, and 191c. However, the present invention is not limited thereto, as the texture may have different forms according to the setting of the alignment direction of the alignment layers that are formed on the first substrate and the second substrate. Further, the positions of the first, second and third power lines and the first and second sub-data lines may be changed according to the changed shapes of the texture.

Figure 6:
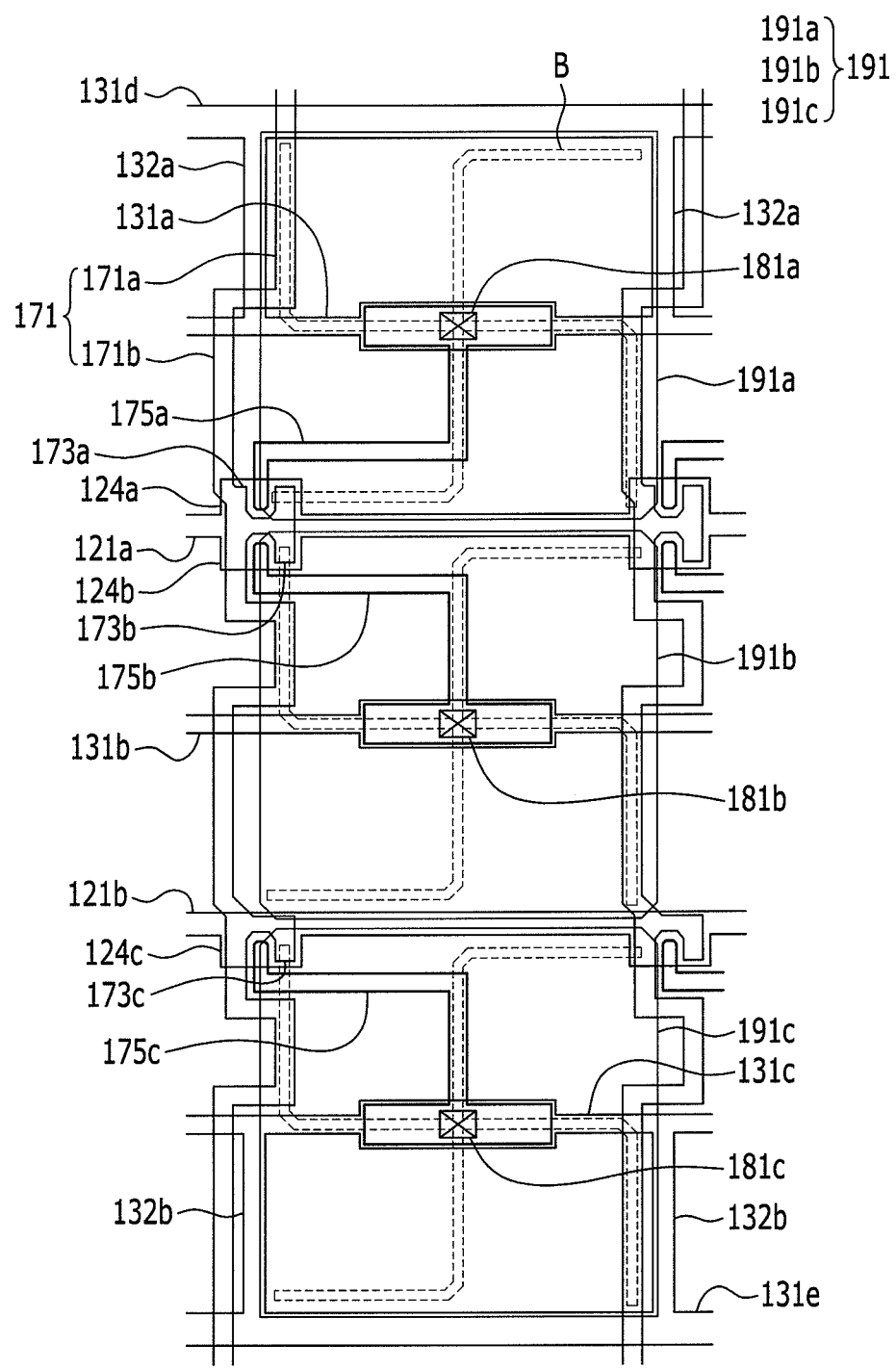
FIG. 6 is a layout view of a lower panel of a liquid crystal display according to an exemplary embodiment of the present invention.

Hereinafter, referring to FIG. 6, a liquid crystal display according to an exemplary embodiment of the present invention will be described in detail. FIG. 6 is a layout view of a lower panel of the liquid crystal display.

Since the structure of the liquid crystal display shown in FIG. 6, has many configurations that are similar to those of the liquid crystal display of FIG. 5, only portions having differences will be described.

Referring to FIG. 6, the liquid crystal display includes a fourth power line 131d and a fifth power line 131e as compared with the display of FIG. 5. Rectangular waves that have different polarities and are applied to the first power line 131a and the third power line 131c may be applied to the fourth power line 131d and the fifth power line 131e.

The fourth power line 131d and the fifth power line 131e are formed on the same layer as the first to the third power lines 131a, 131b, and 131c. The fourth power line 131d is formed at the upper side of the first power line 131a (e.g., above line 131a) and at least partially overlaps the edge of the upper side of the first sub-pixel electrode 191a. The fifth power line 131e is formed at the lower side of the third power line 131c (e.g., below line 131c) and at least partially overlaps the edge of the lower side of the third sub-pixel electrode 191c.

Since a first auxiliary power line 132a is formed between the first power line 131a and the fourth power line 131d, the first power line 131a and the fourth power line 131d are connected to each other. The first auxiliary power line 132a may partially overlap the edges of both sides of the first sub-pixel electrode 191a. Since the fourth power line 131d is connected to the first power line 131a, the same signal as the first power line 131a is applied.

Since a second auxiliary power line 132b is formed between the third power line 131c and the fifth power line 131e, the third power line 131c and the fifth power line 131e are connected to each other. The second auxiliary power line 132b may partially overlap the edges of both sides of the second sub-pixel electrode 191c. Since the fifth power line 131e is connected to the third power line 131c, the same signal as the third power line 131c is applied.

The fourth power line 131d is disposed at the edge of the upper side of one pixel and the fifth power line 131e is disposed at the edge of the lower side of the pixel with respect to only one pixel. The fourth power line 131d is disposed at the upper boundary of a display region including all pixels and the fifth power line 131e is disposed at the lower boundary of the display region with respect to the entire liquid crystal display. Therefore, use of the fourth and fifth power lines 131*d* and 131*e* may prevent the occurrence of light leakage in the boundary region of the pixel.

Figure 7:
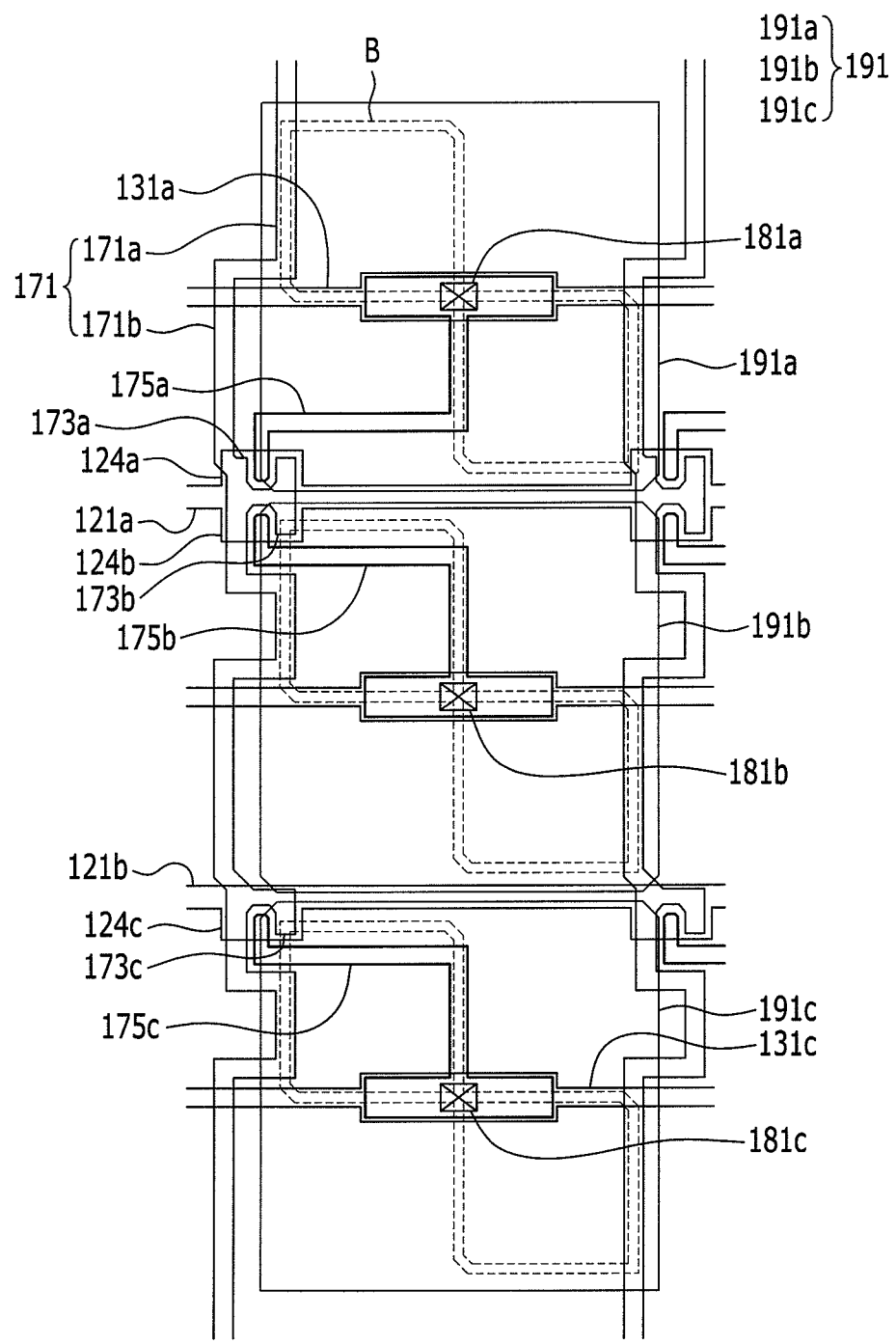
FIG. 7 is a layout view of a lower panel of a liquid crystal display according to an exemplary embodiment of the present invention.

Hereinafter, referring to FIG. 7, a liquid crystal display according to an exemplary embodiment of the present invention will be described in detail. FIG. 7 is a layout view of a lower panel of the liquid crystal display.

The structure of the liquid crystal display of FIG. 7, has many configurations that are similar to the liquid crystal display of FIG. 5. However, a region in which the texture occurs is different from that of the display of FIG. 5. For example, the liquid crystal display of FIG. 7 includes a plurality of domains, which are formed by a photoalignment method by irradiating the alignment layer. The domains may be formed by irradiating light in a plurality of different directions. A photoreactive chain may be disposed on the surface of the alignment layer to lie according to the direction of light irradiation by inclining irradiating light towards the vertical alignment layer.

The same effect as when the surface of the alignment layer is rubbed in a constant direction is ensured by irradiating light in respect to the surface of the alignment layer at an inclined angle. For example, since the alignment direction of the surface of the alignment layer is changed according to the direction of light irradiation, a plurality of domains in which pre-tilt directions of liquid crystal molecules are different from each other may be formed in a pixel by performing an exposure while one pixel is divided into a plurality of regions.

In the lower panel of the liquid crystal display according FIGS. 4-6, each of the first sub-pixel electrode 191*a*, the second sub-pixel electrode 191*b*, and the third sub-pixel electrode 191*c* is divided into two parts of upper and lower parts, and light is irradiated in a left side direction to the portion that corresponds to the upper parts of the first sub-pixel electrode 191*a*, the second sub-pixel electrode 191*b*, and the third sub-pixel electrode 191*c*. Light is irradiated in a right direction to the portion that corresponds to the lower parts of the first sub-pixel electrode 191*a*, the second sub-pixel electrode 191*b*, and the third sub-pixel electrode 191*c*. In addition, in the upper panel that corresponds to the lower panel, each of the first sub-pixel electrode 191*a*, the second sub-pixel electrode 191*b*, and the third sub-pixel electrode 191*c* is divided into two parts of left and right parts, and light is irradiated in a lower side direction to the portion that corresponds to the left parts of the first sub-pixel electrode 191*a*, the second sub-pixel electrode 191*b*, and the third sub-pixel electrode 191*c*. Light is irradiated in an upper side direction to the portion that corresponds to the right parts of the first sub-pixel electrode 191*a*, the second sub-pixel electrode 191*b*, and the third sub-pixel electrode 191*c*.

When the plurality of domains are formed by irradiating light by the above method, the region in which the texture occurs is the portion B of FIG. 4 to FIG. 6.

In the lower panel of the liquid crystal display according to FIG. 7, like the display of FIG. 5, light is irradiated in a left side direction to the portion that corresponds to the upper parts of the first sub-pixel electrode 191*a*, the second sub-pixel electrode 191*b*, and the third sub-pixel electrode 191*c*, and light is irradiated in a right direction to the portion that corresponds to the lower parts of the first sub-pixel electrode 191*a*, the second sub-pixel electrode 191*b*, and the third sub-pixel electrode 191*c*. In the upper panel, unlike the display of FIG. 5, light is irradiated in an upper side direction to the portion that corresponds to the left parts of the first sub-pixel electrode 191*a*, the second sub-pixel electrode 191*b*, and the third sub-pixel electrode 191*c*. Light is irradiated in a lower side direction to the portion that corresponds to the right parts of the first sub-pixel electrode 191*a*, the second sub-pixel electrode 191*b*, and the third sub-pixel electrode 191*c*.

When the plurality of domains are formed by irradiating light by the above method, the region in which the texture occurs is the portion B of FIG. 7.

The region in which the texture occurs in FIG. 7 is slightly different from that of the region of FIG. 5. However, since the region in which the texture occurs at the edges of the left and right sides of the first sub-pixel electrode 191*a*, the second sub-pixel electrode 191*b*, and the third sub-pixel electrode 191*c* is the same as that of the display of FIG. 5, the data line 171 for covering the region is formed in the same manner as that of the display of FIG. 5.

Figure 8:
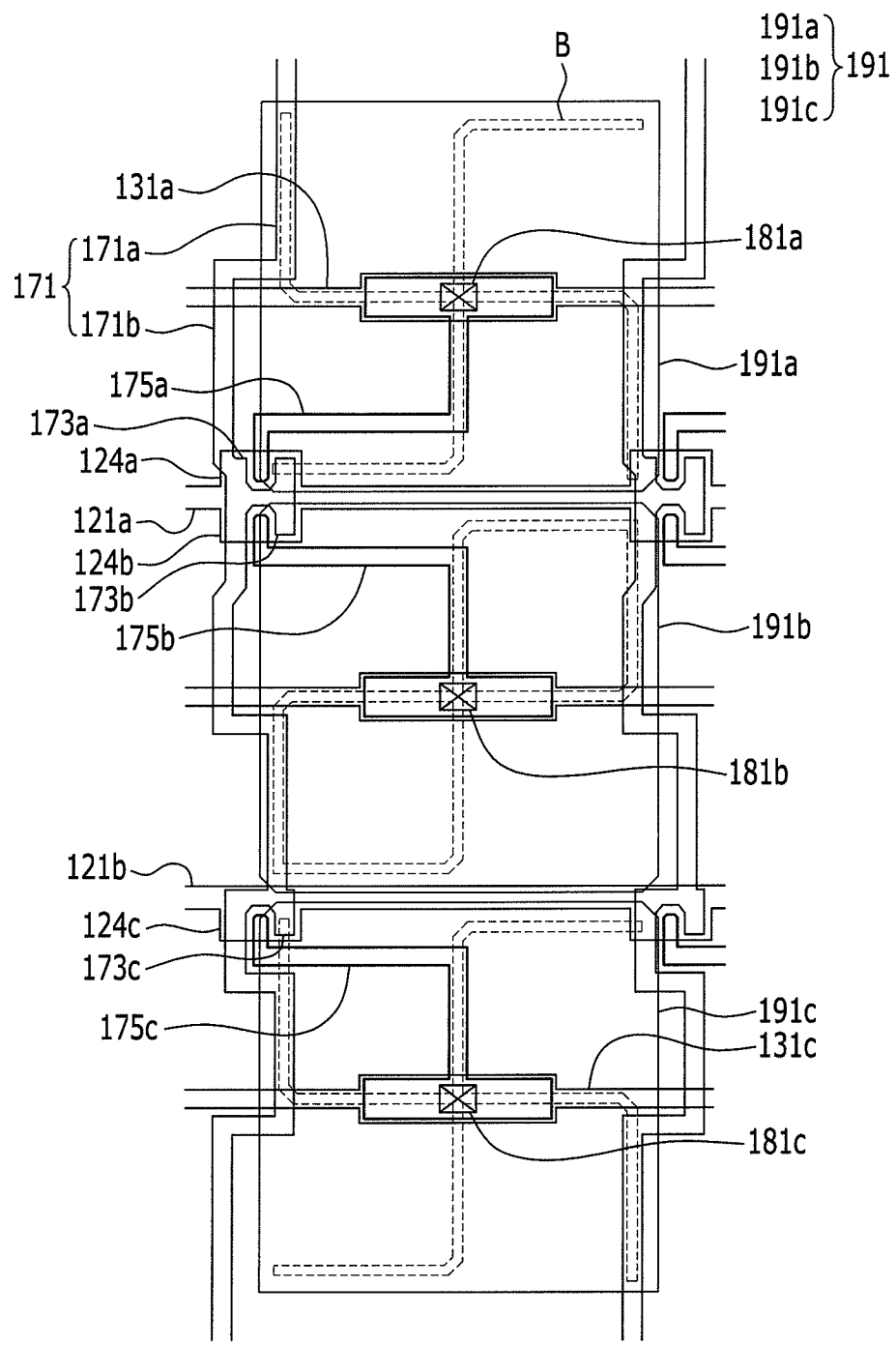
FIG. 8 is a layout view of a lower panel of a liquid crystal display according to an exemplary embodiment of the present invention.

Hereinafter, referring to FIG. 8, a liquid crystal display according to an exemplary embodiment of the present invention will be described below. FIG. 8 is a layout view of a lower panel of the liquid crystal display.

Since the structure of the liquid crystal display of FIG. 8, has many configurations that are similar to those of the liquid crystal display of FIG. 7, portions having differences will be mainly described.

In the lower panel of the liquid crystal display of FIG. 8, light is irradiated in a left side direction to the portions that correspond to the upper parts of the first sub-pixel electrode 191*a* and the third sub-pixel electrode 191*c*, and the lower part of the second sub-pixel electrode 191*b*. Light is irradiated in a right direction to the portions that correspond to the lower parts of the first sub-pixel electrode 191*a* and the third sub-pixel electrode 191*c*, and the upper part of the second sub-pixel electrode 191*b*. In the upper panel, light is irradiated in a lower side direction to the portion that corresponds to the left parts of the first sub-pixel electrode 191*a*, the second sub-pixel electrode 191*b*, and the third sub-pixel electrode 191*c*. Light is irradiated in an upper side direction to the portion that corresponds to the right parts of the first sub-pixel electrode 191*a*, the second sub-pixel electrode 191*b*, and the third sub-pixel electrode 191*c*.

When the plurality of domains are formed by irradiating light by the above method, the region in which the texture occurs is the portion B of FIG. 8.

The data line 171 is formed of the first sub-data line 171*a* and the second sub-data line 171*b* that are connected to each other, and the first sub-data line 171*a* and the second sub-data line 171*b* are disposed on different lines. The first sub-data line 171*a* is formed adjacent an edge of the pixel electrode 191 to the right of the edge, and the second sub-data line 171*b* is formed adjacent the edge of the pixel electrode 191 to the left of the edge.

The first sub-data line 171*a* and the second sub-data line 171*b* may be connected to each other and alternately disposed. The edges of the upper parts of the first and the third sub-pixel electrodes 191*a* and the edge of the left side of the lower part of the second sub-pixel electrode 191*b* overlap the first sub-data line 171*a*. The edges of the right side of the lower parts of the first and the third sub-pixel electrodes 191*a* and the upper part of the second sub-pixel electrode 191*b* overlap the second sub-data line 171*b*. Therefore, the effect of the texture may be decreased by forming the data line 171 in the region in which the texture occurs at the edges of the left and right sides of the pixel.

Figure 9:
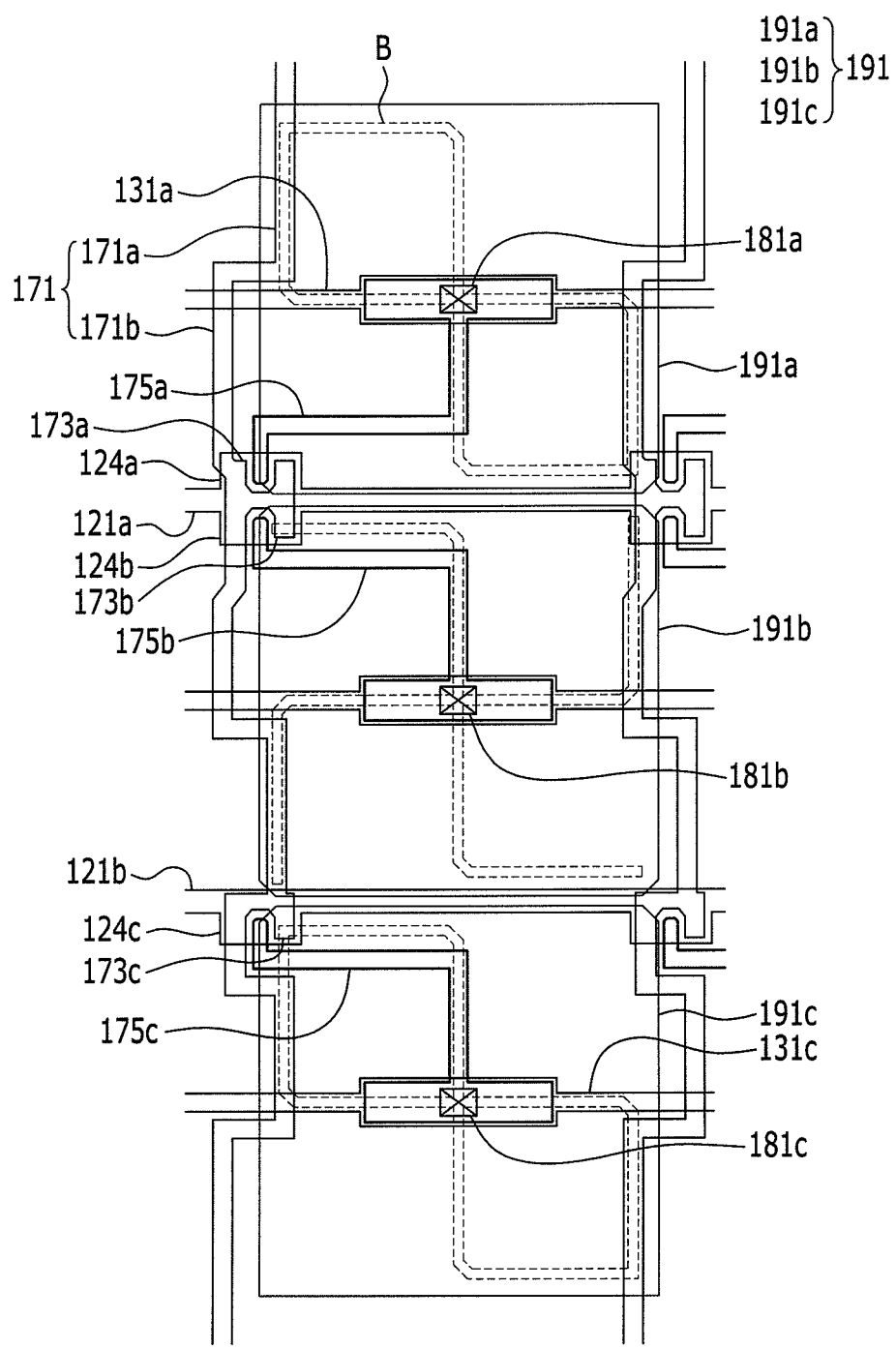
FIG. 9 is a layout view of a lower panel of a liquid crystal display according to an exemplary embodiment of the present invention.

Hereinafter, referring to FIG. 9, a liquid crystal display according to an exemplary embodiment of the present invention will be described in detail. FIG. 9 is a layout view of a lower panel of the liquid crystal display.

Since the structure of the liquid crystal display of FIG. 9, has many configurations that are similar to those of the liquid crystal display of FIG. 8, portions having differences will be mainly described.

In the lower panel of the liquid crystal display of FIG. 9, light is irradiated in a left side direction to the portions that correspond to the upper parts of the first sub-pixel electrode 191*a* and the third sub-pixel electrode 191*c*, and the lower part of the second sub-pixel electrode 191*b*. Light is irradiated in a right direction to the portions that correspond to the lower parts of the first sub-pixel electrode 191*a* and the third sub-pixel electrode 191*c*, and the upper part of the second sub-pixel electrode 191*b*. In the upper panel, light is irradiated in an upper side direction to the portion that corresponds to the left parts of the first sub-pixel electrode 191*a*, the second sub-pixel electrode 191*b*, and the third sub-pixel electrode 191*c*. Light is irradiated in a lower side direction to the portion that corresponds to the right parts of the first sub-pixel electrode 191*a*, the second sub-pixel electrode 191*b*, and the third sub-pixel electrode 191*c*.

When the plurality of domains are formed by irradiating light by the above method, the region in which the texture occurs is the portion B of FIG. 9.

The data line 171 is formed of the first sub-data line 171*a* and the second sub-data line 171*b* that are connected to each other, and the first sub-data line 171*a* and the second sub-data line 171*b* are disposed on different lines. The first sub-data line 171*a* is formed adjacent the edge of the pixel electrode 191 to the right of the edge, and the second sub-data line 171*b* is formed adjacent the edge of the pixel electrode 191 to the left of the edge.

The first sub-data line 171*a* and the second sub-data line 171*b* may be connected to each other and alternately disposed. The edges of the upper parts of the first and the third sub-pixel electrodes 191*a* and 191*c* and the edge of the left side of the lower part of the second sub-pixel electrode 191*b* overlap the first sub-data line 171*a*, and the edges of the rights of the lower parts of the first and the third sub-pixel electrodes 191*a* and 191*c* and the upper part of the second sub-pixel electrode 191*b* overlap the second sub-data line 171*b*. Therefore, the effect of the texture may be decreased by forming the data line 171 in the region in which the texture occurs at the edges of the left and right sides of the pixel.

The region in which the texture occurs in the display of FIG. 9 is slightly different from that of the display of FIG. 8. Since the region in which the texture occurs at the edges of the left and right sides of the first sub-pixel electrode 191*a*, the second sub-pixel electrode 191*b*, and the third sub-pixel electrode 191*c* is the same as that of the display of FIG. 8, the data line 171 for covering the region is formed in the same manner as that of the display of FIG. 8.

A liquid crystal display according to at least one exemplary embodiment of the present invention displays three grays so that the first, second and third sub-pixel electrodes have different voltages, which may expand the visibility of the display when viewed from the side.

A power voltage driver may be provided within or external to any one of the above described embodiments to provide the corresponding voltages to the corresponding power lines. For example, the power voltage driver may provide the low voltage during the first period and the high voltage during the second period to the first power line, the constant voltage during both periods to the second power line, and the high voltage during the first period and the low voltage during the second period to the third power line. The power driving circuit may provide the alternating high and low voltages as square wave signals such that the polarity of the signal applied to the first power line is opposite to that of the signal applied to the second power line. The power voltage driver may provide these signals to the power lines continuously during a frame of the display.

Hereinafter, referring to FIGS. 10 to 13, an optimum area ratio and voltage ratio of the first, second and third sub-pixel electrodes of a display according to at least one embodiment of the invention for improving visibility of the display when viewed from the side will be described below.

Figure 10:
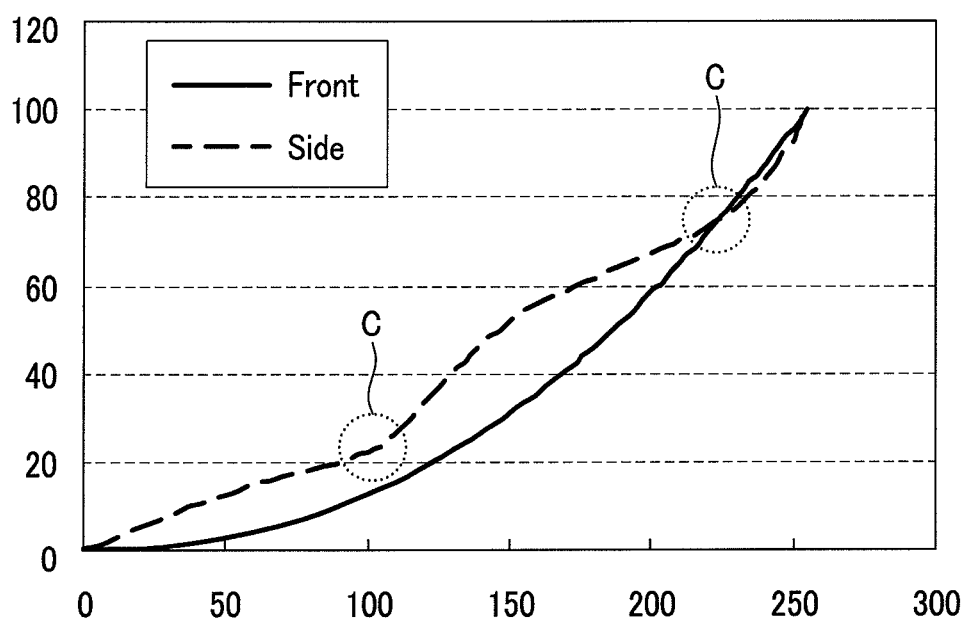
FIG. 10 is a graph that illustrates a V-T curve at a front and a side of a liquid crystal display for a comparison.
Figure 11:
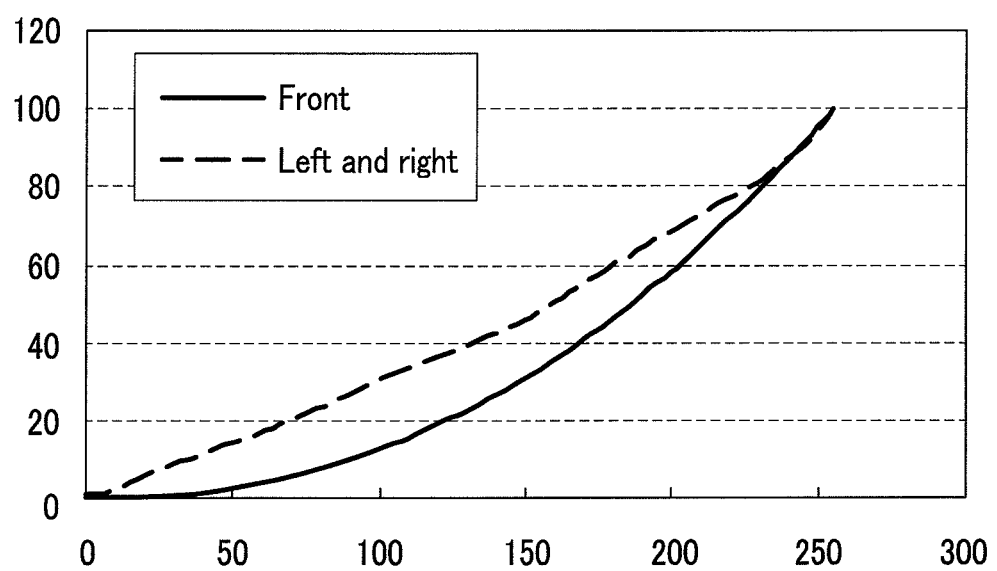
FIG. 11 is a graph that illustrates a V-T curve at a front and a side of a liquid crystal display according to an exemplary embodiment of the present invention where areas of the first-third sub-pixel electrodes are the same and a voltage ratio of the first-third sub-pixel electrodes is 1:0.8:0.6.
Figure 12:
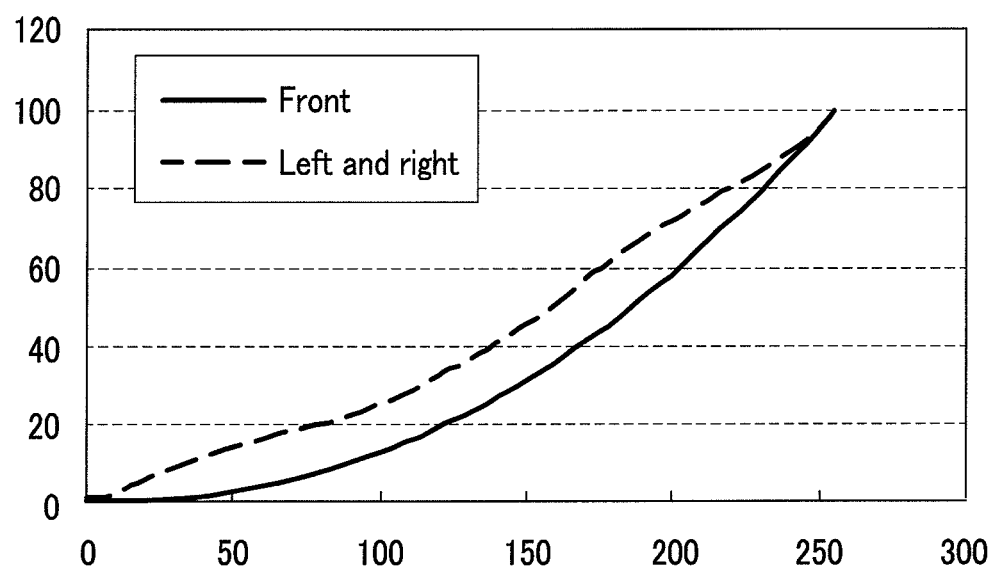
FIG. 12 is a graph that illustrates a V-T curve at a front and a side of a liquid crystal display according to an exemplary embodiment of the present invention where areas of the first-third sub-pixel electrodes are the same and a voltage ratio of the first-third sub-pixel electrodes is 1:0.7:0.55.
Figure 13:
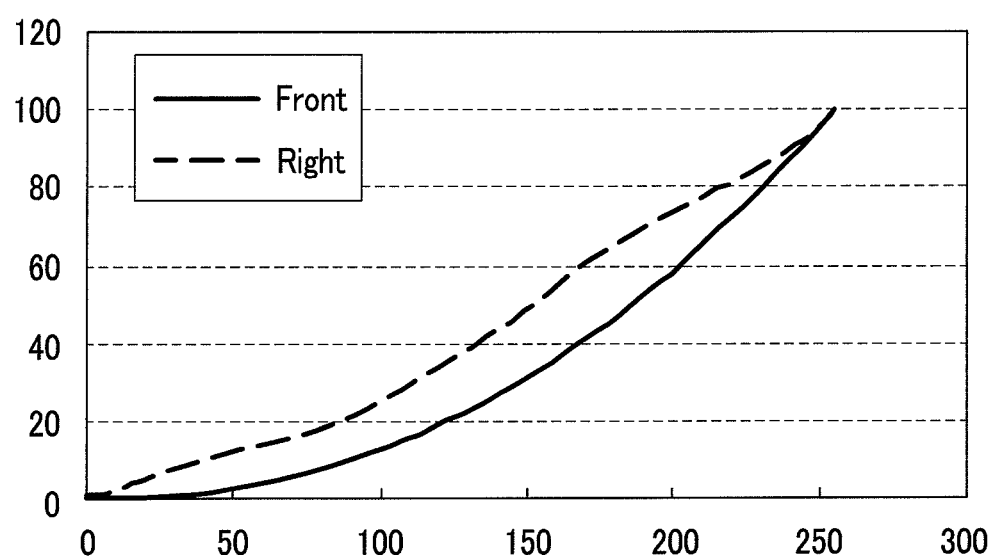
FIG. 13 is a graph that illustrates a V-T curve at a front and a side of a liquid crystal display according to an exemplary embodiment of the present invention where an area ratio of the first-third sub-pixel electrodes is 1:1.5:1.5 and a voltage ratio of the first-third sub-pixel electrodes is 1:0.7:0.55.

FIG. 10 is a graph that illustrates a V-T curve at a front and a side of a regular liquid crystal display. FIG. 11 is a graph that illustrates a V-T curve at a front and a side of a liquid crystal display according to an exemplary embodiment of the present invention where areas of the first and second and third sub-pixel electrodes are the same as each other and a voltage ratio of the first, the second, and the third sub-pixel electrodes is 1:0.8:0.6. FIG. 12 is a graph that illustrates a V-T curve at a front and a side of a liquid crystal display according to an exemplary embodiment of the present invention where areas of the first and second and third sub-pixel electrodes are the same as each other and a voltage ratio of the first, the second, and the third sub-pixel electrodes is 1:0.7:0.55. FIG. 13 is a graph that illustrates a V-T curve at a front and a side of a liquid crystal display according to an exemplary embodiment of the present invention where an area ratio of the first, second, and third sub-pixel electrodes is 1:1.5:1.5 and a voltage ratio of the first, the second, and the third sub-pixel electrodes is 1:0.7:0.55.

In FIG. 10 to FIG. 13, a horizontal axis represents a data voltage, a vertical axis represents transmittance, a solid line represents visibility from the front, and a dotted line represents visibility from the side.

In a regular liquid crystal display, as shown in FIG. 10, when a difference between a voltage that represents a high gray and a voltage that represents a low gray is large, a bumping occurs at the time the pixel electrode is turned on to which the voltage representing the low gray is applied.

However, in a liquid crystal display according to at least one exemplary embodiment of the present invention, as shown in FIG. 11 to FIG. 13, the bumping may not be present.

FIG. 11 to FIG. 13 illustrate representative examples. For example, in at least one embodiment, the voltage ratio of the first, second and third sub-pixel electrodes is 1:0.6 to 0.85:0.4 to 0.7. In addition, in at least one embodiment, the area ratio of the first, second and third sub-pixel electrodes is 1:1 to 2:1 to 2. If the voltage ratio and the area ratio are too small, the expansion to visibility is small, and if the voltage ratio and the area ratio are too large, a bumping period may be present.

Having described exemplary embodiments of the invention, it is to be understood that the invention is not limited to the disclosed embodiments, but, on the contrary, is intended to cover various modifications and equivalent arrangements included within the spirit and scope of the disclosure.

What is claimed is:

1. A liquid crystal display, comprising:
   a first substrate;
   a gate line and a data line that are formed on the first substrate;
   a first power line to which a first low voltage is applied during a first period and a first high voltage is applied during a second period;
   a second power line to which a constant second voltage is applied during the first period and second period;
   a third power line to which a third high voltage is applied during the first period and a third low voltage is applied during the second period;

a first switching element, a second switching element and a third switching element that are connected to the gate line and data line;

an auxiliary boosting capacitor that is connected to the first switching element and the first power line;

an auxiliary storage capacitor that is connected to the second switching element and the second power line;

an auxiliary dropping capacitor that is connected to the third switching element and the third power line; and a first alignment layer that is formed by irradiating the first substrate in different directions, wherein the first power line, the second power line and the third power line overlap a texture that is generated when the first alignment layer is irradiated in different directions.

2. The liquid crystal display of claim 1, wherein the first low voltage and the third low voltage are the same as each other, the first high voltage and the third high voltage are the same as each other.

3. The liquid crystal display of claim 2, wherein: the second voltage is an average value of the first low voltage and the first high voltage.

4. The liquid crystal display of claim 1, wherein: an average voltage of the auxiliary boosting capacitor is higher than an average voltage of the auxiliary storage capacitor, an average voltage of the auxiliary storage capacitor is higher than an average voltage of the auxiliary dropping capacitor.

5. The liquid crystal display of claim 4, wherein: the voltage of the auxiliary storage capacitor is a fourth voltage during the first period and the second period, the voltage of the auxiliary boosting capacitor is a fifth voltage that is higher than the fourth voltage during the first period and the fourth voltage during the second period, and the voltage of the auxiliary dropping capacitor is a sixth voltage that is lower than the fourth voltage during the first period and the fourth voltage during the second period.

6. The liquid crystal display of claim 1, further comprising:
a first liquid crystal capacitor that is connected to the first switching element and the first power line;
a second liquid crystal capacitor that is connected to the second switching element and the second power line; and
a third liquid crystal capacitor that is connected to the third switching element and the third power line.

7. The liquid crystal display of claim 6, wherein: an average voltage of the first liquid crystal capacitor is higher than an average voltage of the second liquid crystal capacitor, the average voltage of the second liquid crystal capacitor is higher than an average voltage of the third liquid crystal capacitor.

8. The liquid crystal display of claim 6, wherein: a voltage of the second liquid crystal capacitor is a seventh voltage during the first period and the second period, the voltage of the first liquid crystal capacitor is an eighth voltage that is higher than the seventh voltage during the first period and the seventh voltage during the second period, and the voltage of the third liquid crystal capacitor is a ninth voltage that is lower than the seventh voltage during the first period and the seventh voltage during the second period.

9. The liquid crystal display of claim 7, wherein: a ratio of the average voltage of the first liquid crystal capacitor, the average voltage of the second liquid crystal capacitor, and the average voltage of the third liquid crystal capacitor is 1:0.6 to 0.85:0.4 to 0.7.

10. The liquid crystal display of claim 1, wherein: the gate line includes a first sub-gate line and a second sub-gate line, and the same voltage is applied to the first sub-gate line and the second sub-gate line.

11. The liquid crystal display of claim 10, wherein: the first switching element and the second switching element are connected to the first sub-gate line, and the third switching element is connected to the second sub-gate line.

12. The liquid crystal display of claim 1, further comprising: a pixel electrode that includes a first sub-pixel electrode that is connected to the first switching element, a second sub-pixel electrode that is connected to the second switching element, and a third sub-pixel electrode that is connected to the third switching element, wherein a terminal of a side of the auxiliary boosting capacitor is the first sub-pixel electrode, a terminal of a side of the auxiliary storage capacitor is the second sub-pixel electrode, and a terminal of a side of the auxiliary dropping capacitor is the third sub-pixel electrode.

13. The liquid crystal display of claim 12, wherein: an area ratio of the first sub-pixel electrode, the second sub-pixel electrode and the third sub-pixel electrode is 1:1 to 2:1 to 2.

14. A liquid crystal display, comprising:
a first substrate;
a gate line, a data line, a first power line, a second power line and a third power line that are formed on the first substrate;
a first switching element, a second switching element and a third switching element that are connected to the gate line and data line;
a pixel electrode that includes a first sub-pixel electrode that is connected to the first switching element, a second sub-pixel electrode that is connected to the second switching element, and a third sub-pixel electrode that is connected to the third switching element;
a first alignment layer that is formed by irradiating the first substrate in different directions; a second substrate; a common electrode that is formed on the second substrate;
a second alignment layer that is formed by irradiating the second substrate in different directions; and
a liquid crystal layer that is formed between the first substrate and the second substrate,
wherein a first low voltage is applied during a first period and a first high voltage is applied during a second period to the first power line, a constant second voltage is applied during the first period and a second period to the second power line, a third high voltage is applied during the first period and a third low voltage is applied during the second period to the third power line, and the first power line, the second power line, the third power line and the second alignment layer overlap a texture that is generated by irradiating the first alignment layer in different directions.

15. The liquid crystal display of claim 14, wherein: the first low voltage and the third low voltage are the same as each other, the first high voltage and the third high voltage are the same as each other.

16. The liquid crystal display of claim 15, wherein: the second voltage is an average value of the first low voltage and the first high voltage.

17. The liquid crystal display of claim 14, wherein: an average voltage of the first sub-pixel electrode is higher than an average voltage of the second sub-pixel electrode, and the average voltage of the second sub-pixel electrode is higher than an average voltage of the third sub-pixel electrode.

18. The liquid crystal display of claim 14, wherein: a voltage ratio of the first sub-pixel electrode, the second sub-pixel electrode and the third sub-pixel electrode is 1:0.6 to 0.85:0.4 to 0.7.

19. The liquid crystal display of claim 14, wherein: an area ratio of the first sub-pixel electrode, the second sub-pixel electrode and the third sub-pixel electrode is 1:1 to 2:1 to 2.

20. The liquid crystal display of claim 14, wherein: the data line includes a first sub-data line and a second sub-data line that are connected to each other, the first sub-data line is formed adjacent an edge of the pixel electrode to one side of the edge, the second sub-data line is formed adjacent the edge to the other side of the edge.

21. The liquid crystal display of claim 20, wherein: the first sub-pixel electrode, the second sub pixel electrode and the third sub-pixel electrode are divided into an upper portion and a lower portion, an edge of a side of the upper portion overlaps the first sub-data line, and an edge of the other side of the lower portion overlaps the second sub-data line.

22. The liquid crystal display of claim 20, wherein: the first sub-pixel electrode, the second sub-pixel electrode and the third sub-pixel electrode are divided into an upper portion and a lower portion, edges of sides of the upper portion of the first and the third sub-pixel electrodes and the lower portion of the second sub-pixel electrode overlap the first sub-data line, edges of the other sides of the lower portion of the first and the third sub-pixel electrodes and the upper portion of the second sub-pixel electrode overlap the second sub-data line.

23. The liquid crystal display of claim 14, wherein: the first power line is formed in a direction that is parallel to the gate line at a central portion of the first sub-pixel electrode, the second power line is formed in a direction that is parallel to the gate line at a central portion of the second sub-pixel electrode, and the third power line is formed in a direction that is parallel to the gate line at a central portion of the third sub-pixel electrode.

24. A thin film transistor array panel, comprising:
a first substrate;
a pair of gate lines that is formed on the first substrate;
a first power line that is formed on the first substrate and is disposed at an upper side above the pair of gate lines, a second power line that is disposed between the pair of gate lines, and a third power line that is disposed at a lower side below the pair of gate lines;
a data line that is formed on the first substrate, crosses the pair of gate lines, and is insulated from the gate lines;
a first switching element, a second switching element and a third switching element that are connected to one of the pair of gate lines and the data line;
a first sub-pixel electrode, a second sub-pixel electrode and a third sub-pixel electrode that are connected to the first switching element, the second switching element and the third switching element, respectively,
wherein rectangular waves that have different polarities are applied to the first power line and the third power line, and a signal having a constant potential is applied to the second power line,
wherein the first switching element is located between the first and second power lines, the third switching element is located between the second and third power lines, and gates of the first and third switching elements are connected to one another.

25. The thin film transistor array panel of claim 24, wherein: output terminals of the first switching element, the second switching element and the third switching element include an extended part, and the extended parts of the first switching element, the second switching element and the third switching element overlap the first power line, the second power line and the third power line, respectively.

26. The thin film transistor array panel of claim 25, wherein: the extended parts of the first switching element, the second switching element and the third switching element are electrically connected to the first sub-pixel electrode, second sub-pixel electrode and third sub-pixel electrode through contact holes, respectively.

27. The thin film transistor array panel of claim 24, further comprising:
a fourth power line that is formed on the first substrate above the first power line, and overlaps at least a portion of an edge of a side of the first sub-pixel electrode; and
a fifth power line that is formed on the first substrate below the third power line, and overlaps at least a portion of an edge of a side of the third sub-pixel electrode.

28. The thin film transistor array panel of claim 27, wherein: rectangular waves that have different polarities and are applied to the first power line and the third power line are applied to the fourth power line and the fifth power line.

29. The thin film transistor array panel of claim 27, wherein: the fourth power line is connected to the first power line and the fifth power line is connected to the third power line.

30. A liquid crystal display, comprising:
a first substrate;
a pair of gate lines, a data line, a first power line, a second power line and a third power line are located on the first substrate;
a pixel electrode that includes a first sub-pixel, a second sub-pixel, and a third sub-pixel, wherein a switching element of each sub-pixel is connected to one of the pair of gate lines and the data line; a second substrate;
a common electrode that is located on the second substrate;
a liquid crystal layer that is located between the first substrate and the second substrate; and
a power voltage driver configured to output a low voltage during a first period and a high voltage during a subsequent second period to the first power line, configured to output a constant voltage during both periods to the second power line, and configured to output the high voltage during the first period and the low voltage during the second period to the third power line,
wherein the first power line, the second power line and the third power line overlap the first sub-pixel, the second sub-pixel, and the third sub-pixel, respectively,
wherein the first power line is disposed above the pair of gate lines and the third power line is disposed below the pair of gate lines.

* * * * *